Patented Mar. 22, 1938

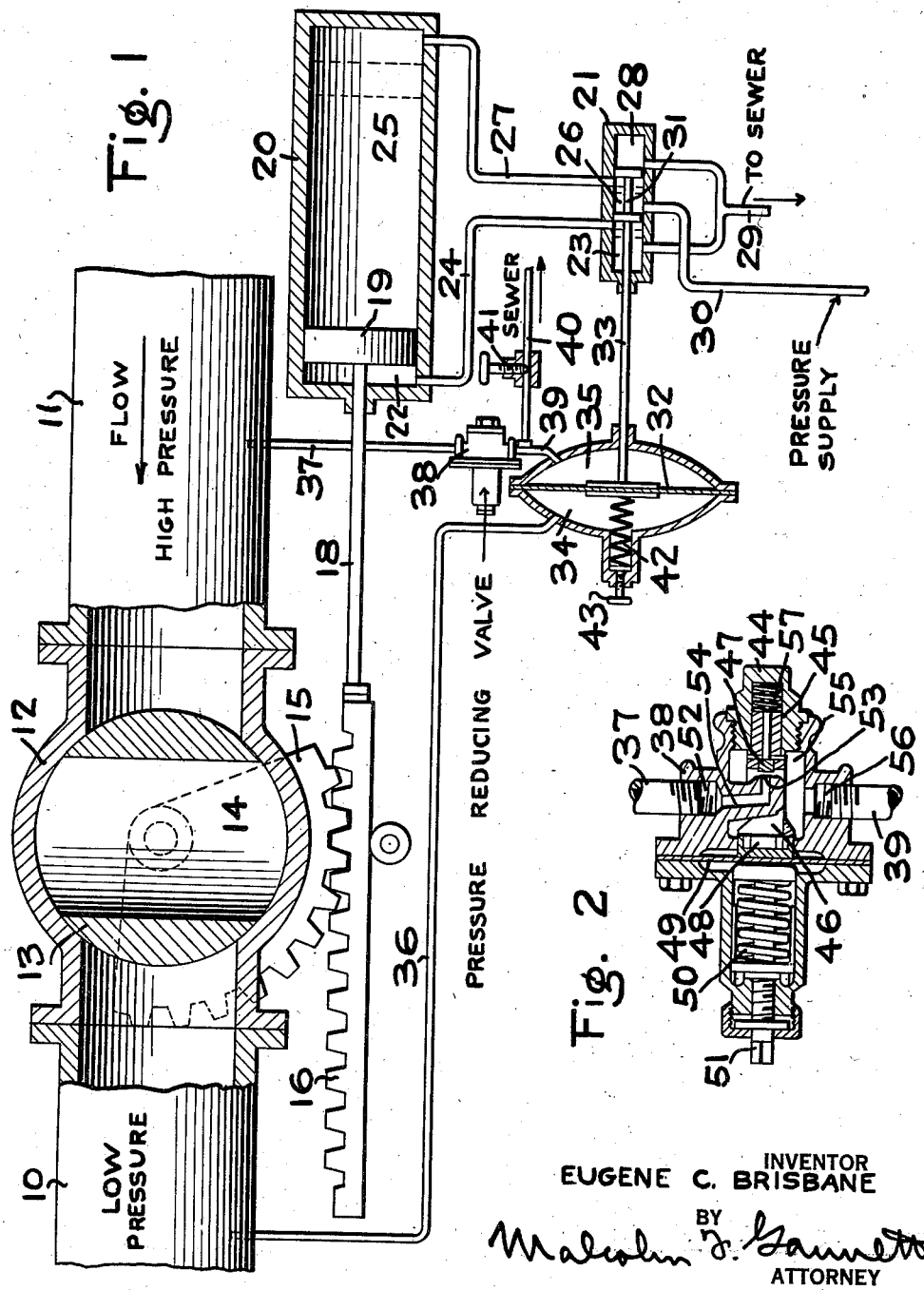

2,111,837

UNITED STATES PATENT OFFICE 2,111,837

FLUID CONTROL MEANS

Eugene C. Brisbane, Denver, Colo., assignor to S. Morgan Smith Company, York, Pa., a corporation of Pennsylvania Application May 8, 1937, Serial No. 141,402

2 Claims. (Cl. 137—153)

This invention relates to fluid control means.

In some installations, fluid under relatively high pressure is delivered to the pipe lines. However, since it is desirable to withdraw from or maintain in sections of the pipe lines fluid at a somewhat lower pressure, means are usually installed in the pipe lines for reducing the relatively high pressure fluid, so that the fluid will have a predetermined low pressure.

An object of the invention is to provide an improved fluid controlling means for mains, pipe lines, and the like, in which the main pipe line has installed therein a valve adapted to control communication in the main in such a manner that the pressure of the fluid on one side of the valve is lower than the pressure of the fluid on the opposite side of the valve.

Another object of the invention is to provide an improved means for controlling the fluid in a pipe line so that relatively high pressure fluid is reduced to a predetermined low pressure and the low pressure fluid is maintained at a substantially uniform pressure.

With the foregoing and other objects and advantages in view, the invention consists in the preferred construction and arrangement of the several parts which will be hereinafter fully described and claimed.

In the accompanying drawing:—

Figure 1 is a diagrammatic view, partly in section, of a fluid control apparatus embodying the present invention; and Fig. 2 is an enlarged section of the pressure reducing valve shown in Fig. 1.

Referring to the drawing the main pipe line consists of two sections 10 and 11 leading from opposite sides of a valve 12.

Pipe 11 may lead from a suitable source of supply, and the pressure of the fluid in said pipe is normally maintained at a predetermined pressure by means of a suitable pump (not shown).

Pipe 10 conducts fluid under pressure considerably lower than the pressure of the fluid in pipe 11.

The main valve 12 has a rotatable plug 13 with a waterway 14 formed therein.

The plug is adapted to be rotated by any suitable mechanism so as to control communication from pipe 11 to pipe 10.

In the present instance the plug operating mechanism is shown as comprising a sector 15 which is fixed to one end of the stem of the valve plug 13 and has teeth in meshing relationship with the teeth of a rack bar 16.

One end of the rack bar 16 is connected to the end of a rod 18 of a piston 19 mounted in a cylinder 20.

Reciprocation of the piston 19 within the cylinder 20 is adapted to turn the plug 13 through an angle of approximately 90° so as to position the waterway 14 of the plug 13, whereby the flow of fluid through the pipes 10 and 11 is either cut off or permitted.

For the purpose of controlling the operation of the piston 19, a suitable control valve device 21 is provided.

Chamber 22 on one side of the piston 19 is connected to chamber 23 of the control valve device 21 by a passage or pipe 24.

Chamber 25 on the opposite side of piston 19 is connected to chamber 26 of the control valve device 21 by a passage or pipe 27.

The control valve device 21 is also formed with a chamber 28, and chambers 23 and 28 of the control valve are connected to a sewer or the like (not shown) by a pipe 29.

Fluid under pressure is supplied to chamber 26 of the control valve device 21 through a pipe 30 which leads from a suitable source of supply.

The fluid under pressure thus supplied to chamber 26 is alternately supplied to the piston chambers 22 and 25, respectively, by means of a pilot valve 31 which is operatively connected to a diaphragm 32 by means of a rod 33.

The diaphragm 32 is mounted in a suitable casing, so that chambers 34 and 35 are formed on opposite sides of the diaphragm.

Chamber 34 is directly connected to the low pressure pipe 10 by means of a pipe 36, so that the fluid under pressure in the diaphragm chamber 34 will at all times be substantially the same as the pressure of the fluid in the pipe line on the low pressure side of the main valve 12.

Leading from the high pressure pipe line 11 is a pipe 37 which is connected to the high pressure side of a pressure reducing valve device 38. The low pressure side of the valve device 38 is connected to diaphragm chamber 35 by a pipe 39.

Also connected to pipe 39 between the pressure reducing valve 38 and the diaphragm chamber 35 is a pipe 40 having mounted therein a needle valve 41, the purpose of which will be hereinafter more fully described. Pipe 40 may lead to a sewer or a like free discharge (not shown).

The pressure reducing valve device 38 may be of any suitable type whereby the pressure of the fluid supplied to diaphragm chamber 35 will be at a considerably lower pressure than the pressure of the fluid in pipe 11. However, the pressure of the fluid thus supplied to diaphragm chamber 35 should be somewhat greater than the pressure of the fluid supplied to diaphragm chamber 34 from pipe 10 by pipe 36.

On the side of the diaphragm facing low pressure chamber 34, there is an expansible coil spring 42. The pressure of spring 42 is adapted to be adjusted by means of a set screw or other suitable device 43.

The construction is such that the pressure of the fluid in diaphragm chamber 34, plus the pressure of the spring 42, normally equals the pressure of the fluid supplied from the high pressure pipe 11 through the pressure reducing valve device 38 to diaphragm chamber 35 so that the diaphragm 32 will be normally balanced.

As shown in Fig. 2, the pressure reducing valve device 38 may comprise a body having a bottom plug 44 mounted therein. The plug 44 is formed with a bore 45 in which is mounted one end of a yoke 46. The yoke 46 is formed with a valve disk 47 and a yoke cap 48, said yoke cap being spaced a suitable distance from the valve disk 47.

The yoke cap 48 bears against one side of a diaphragm 49. Acting against the opposite side of the diaphragm 49 is a spring 50, the tension of which is adapted to be adjusted by means of a screw 51.

The body of the pressure reducing valve device 37 is formed with a threaded opening 52 for the reception of one end of pipe 37 which leads from the supply of high pressure fluid.

Formed within the body of the pressure reducing valve device 38 is a valve seat 53 for the valve disk 47. Opening 52 is in communication with valve seat 53 through a port 54.

The pressure reducing valve body 38 is also formed with a chamber 55 which is in communication with a threaded opening 56 to which pipe 39 heretofore referred to is connected.

Normally the valve disk 47 is in spaced relation with the valve seat 53 so that the valve is open, said valve disk being held in such position by spring 50. Supply pressure delivered to the reducing valve through pipe 37 flows through port 54, from which it passes through the gap between valve disk 47 and the valve seat 53 and enters chamber 55 at a reduced pressure. From chamber 55 the fluid under reduced pressure flows through pipe 39 to diaphragm chamber 35.

When the pressure builds up in chamber 55 it raises the diaphragm 49 permitting spring 57 to force the yoke 46, carrying valve disk 47 towards the seat 53 until the disk 47 reaches a point at which it throttles or reduces the initial pressure to the adjusted delivery pressure. In this way fluid under reduced pressure will be constantly supplied to diaphragm chamber 35 through pipe 39.

Since pipe 39 is connected to a sewer by means of pipe 40, the pressure of the fluid thus delivered to diaphragm chamber 35 under reduced pressure will not build up, as there is a constant leakage of fluid from the diaphragm chamber 35 to the sewer. The purpose of the needle valve 41 is to control the amount of such leakage of fluid from the diaphragm chamber 35. By adjusting the position of the needle valve 41, excess leakage of fluid from the diaphragm chamber 35 will be prevented, so that the pressure of the fluid within diaphragm chamber 34 plus the pressure of spring 42 will balance the pressure of the fluid in diaphragm chamber 35.

In operation, under normal conditions the valve plug 13 will be in closed position, as shown in Fig. 1, while the pressure of the fluid in pipe 10 remains at the predetermined pressure lower than the high pressure of the fluid in pipe 11, and said plug will remain in closed position as long as the pressure of the fluid in pipe 10 remains substantially constant.

While the parts of the apparatus are in this position, diaphragm 32 will remain balanced in the manner heretofore described, and there will be a continuous flow of fluid through the pressure reducing valve device 38 and also through pipe 40, past the needle valve 41.

When the pressure of the fluid in pipe 10 drops a predetermined amount, a corresponding drop in pressure in diaphragm chamber 34 will also occur, due to the direct connection between chamber 34 and the pipe 10 provided by pipe 36.

As soon as the pressure in chamber 34 drops a predetermined amount, the diaphragm 32 will be unbalanced and, therefore, said diaphragm will be moved toward the left, through the action of the high pressure of the fluid in chamber 35.

Movement of the diaphragm 32 towards the left compresses the spring 42 and effects a corresponding movement of pilot valve 31, so that said pilot valve is shifted from the full line position, Fig. 1, to the dotted line position.

With the position of the pilot valve 31 thus shifted, piston chamber 25 will be connected to the sewer through pipe 27, chamber 28 and pipe 29, and the piston chamber 22 will be supplied with fluid under pressure from pipe 30, through chamber 26 and pipe 24, thereby moving piston 19 and rack bar 16 toward the right.

Movement of the rack bar 16 toward the right turns the valve plug 13 from closed to open position, thereby establishing communication from pipe 11 to pipe 10, and permitting the high pressure fluid in pipe 11 to flow into pipe 10, thereby increasing the pressure of the fluid in pipe 10.

The valve plug 13 will remain in open position until the pressure in diaphragm chamber 34 is increased. Thus, as the pressure of the fluid in pipe 10 rises, the pressure in diaphragm chamber 34 will correspondingly rise until the pressure of the fluid in chamber 34 plus the pressure of spring 42, overcomes the pressure of the fluid on the opposite side of the diaphragm supplied to chamber 35 by means of the reducing valve device 38, and the diaphragm is moved towards the right, thereby actuating the pilot valve 31 whereby the parts will be returned to the valve closed position shown in Fig. 1. The parts will then remain in such position until the pressure in pipe 10 again drops a predetermined amount, when the operation will be repeated.

Having thus described my invention, what I claim is:—

1. Fluid controlling apparatus comprising a main line; a valve for controlling the flow of fluid in said main line whereby the pressure of the fluid in the main line on one side of the valve is higher than the pressure of the fluid in the main line on the opposite side of the valve, fluid pressure operated means for actuating said valve for opening and closing the same, a control valve for controlling the operation of said main valve operating means, a diaphragm for operating said control valve, said diaphragm having a spring on one side thereof, means for supplying fluid to the spring side of said diaphragm from the portion of the main line on the side of said main valve having the lower pressure, and means for supplying fluid to the opposite side of said diaphragm under reduced pressure from the main line on the side of the main valve having high pressure, whereby normally the pressures on both sides of said diaphragm are balanced, said control valve being operated by said diaphragm upon a predetermined change in the pressure of the fluid in the main line on the low pressure side of the main valve to effect operation of said main valve so that the low pressure fluid in the main line is maintained at a predetermined pressure.

2. Fluid controlling apparatus comprising a main line valve, fluid pressure operated means for actuating said valve for opening and closing the same, a control valve for controlling the operation of said main valve operating means, a diaphragm for operating said control valve, means for supplying fluid from the main line on one side of said main valve under predetermined reduced pressure to one side of said diaphragm, means for supplying fluid from the main line on the opposite side of said main valve, and a spring acting on the same side of the diaphragm as the side to which the second named fluid is supplied to balance the diaphragm, said control valve being operated by said diaphragm upon a predetermined change in the pressure of the fluid in the main line on the side of said main valve to which the spring side of the diaphragm is connected whereby the pressure of the fluid in the main line on the latter named side of the main valve is maintained at a predetermined lower pressure to the pressure of the fluid in the main line on the opposite side of the main valve.

EUGENE C. BRISBANE.